United States Patent [19]

Kosugi et al.

[11] Patent Number: 4,730,923
[45] Date of Patent: Mar. 15, 1988

[54] HEADLIGHT OPTICAL AXIS AIMING MEASURING APPARATUS AND METHOD

[75] Inventors: Hideaki Kosugi, Ebina; Keiichi Fukuda, Kitakyusyu; Kazuhiro Yoshitomi, Atsugi; Kouji Takao, Zama, all of Japan

[73] Assignee: Nissan Motor Company, Limited, Kanagawa, Japan

[21] Appl. No.: 818,266

[22] Filed: Jan. 13, 1986

[30] Foreign Application Priority Data

Jan. 14, 1985 [JP] Japan .................................. 60-4561
Nov. 19, 1985 [JP] Japan ................................ 60-259546

[51] Int. Cl.$^4$ .............................................. G01J 1/00
[52] U.S. Cl. ..................................... 356/121; 33/335; 33/613
[58] Field of Search ....................... 356/121, 152–154; 33/180 L, 288, 335

[56] References Cited

U.S. PATENT DOCUMENTS 2,913,825 11/1969 MacMillan .......................... 356/121
3,841,759 10/1974 Turner ................................ 356/121
4,063,365 12/1977 Hopkins et al. ..................... 356/121

Primary Examiner—R. A. Rosenberger
Assistant Examiner—Crystal D. Cooper
Attorney, Agent, or Firm—Schwartz, Jeffery, Schwaab, Mack, Blumenthal & Evans

[57] ABSTRACT

An inventive headlight optical axis aiming measuring apparatus and method is disclosed. The apparatus includes a head measuring horizontal and vertical inclinations of a front lens surface (34) of a headlight (12) installed in a vehicle (2) and including a plurality of contact-type displacement sensors (48, 49, 50, 51), each of which is associated with a device (28, 29, 30) in contact with the front lens surface (34) and moving in accordance with the inclinations of the front lens surface (34), a support (15) for the displacement sensors (48, 49, 50, 51), and device for checking the headlight optical axis aiming in accordance with a fixed relationship between inclinations of a headlight optical axis and the front lens surface (34) by means of outputs of the measuring head (9). In accordance with this invention, the headlight need ot come on and a large space is not required for projecting the headlight beam onto a screen.

14 Claims, 18 Drawing Figures

HEADLIGHT OPTICAL AXIS AIMING MEASURING APPARATUS AND METHOD

BACKGROUND OF THE INVENTION

1. Field of the Invention

This invention relates to an apparatus and method of measuring the optical axis aiming or orientation of automotive vehicle headlights.

2. Description of the Prior Art

Generally, it is important to aim the headlights correctly. Incorrect aiming might blind an oncoming driver and lead to a serious accident. It can also reduce the driver's ability to see the road properly.

Japanese published unexamined patent application No. 57-179639 and Japanese patent application No. 58-21209 show prior examples of headlight aiming apparatuses and methods. In these apparatuses and methods, a projecting screen receives light beams projected directly or reflected from the headlights and a checking device checks whether or not the light pattern on the screen is restricted to within a given zone. Thus, these apparatuses and methods require a lot of room for the screen to receive the direct or reflected light beams from the headlights, which mean a very large apparatus.

In addition, recent diversifications in headlights due to the increased variety of car models and the employment of halogen lamps require adjustment of the screen. Thus, the length of time required to check out the aiming of the headlights in an automatic manufacturing line for automotive vehicles has increased.

SUMMARY OF THE INVENTION

An object of this invention is to provide an apparatus for measuring the aiming of headlight optical axes which measures the horizontal and vertical inclinations of a front lens surface of a headlight installed on a vehicle and checks the headlight optical axis aiming in accordance with a fixed spatial relationship between inclinations of the front lens surface and the headlight optical axis. In order to achieve this object, an inventive apparatus comprises a head measuring horizontal and vertical inclinations of a front lens surface of a headlight installed in a vehicle and including a plurality of contact-type displacement sensors, each of which is associated with a device in contact with the front lens surface and displaced in accordance with the inclinations of the front lens surface, a support for the displacement sensors, and means for checking the headlight optical axis aiming in accordance with a fixed relationship between inclinations of the headlight optical axis and the front lens surface and the outputs of the measuring head.

In accordance with this invention, a headlight installed in a vehicle need not be turned on and not much space is required to project the headlight beam onto a screen. The inventive apparatus is more compact than the conventional type and can achieve a measurement accuracy equal to or greater than the conventional type.

The results of the headlight optical axis aiming check are used as, e.g., instructions for rotation of a screwdriver unit mounted on an industrial robot so that the screwdriver unit can tighten or loosen aiming adjuster screws of the headlight. Alternatively, the results of the headlight optical axis aiming check may be displayed in order for a worker to tighten or loosen the aiming adjuster screws manually.

Another object of this invention is to provide a method for measuring the aiming of a headlight optical axis.

DESCRIPTION OF THE PREFERRED EMBODIMENTS

The preferred embodiments of this invention will be described in detail with reference to FIGS. 1 to 18.

FIRST EMBODIMENT

Figure 1:
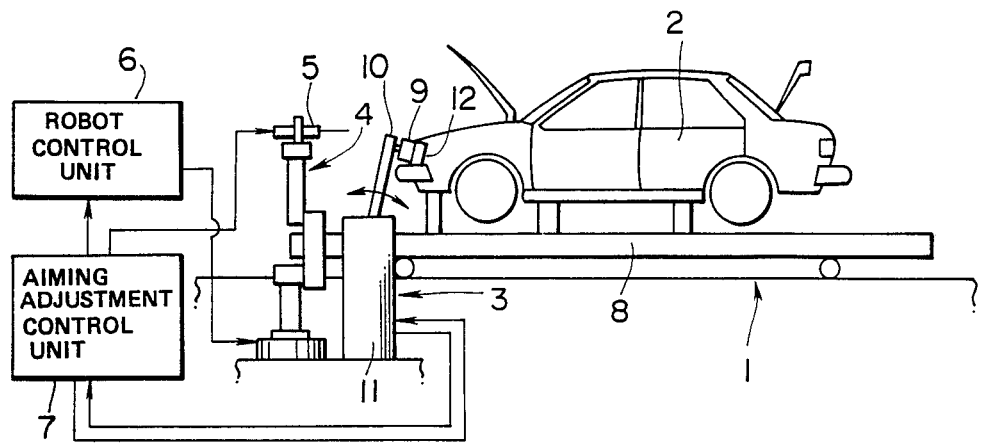
FIG. 1 is a diagram of a headlight-aiming adjustment system including a headlight optical axis aiming measuring head according to a first embodiment of this invention.

As shown in FIG. 1, a headlight-aiming adjustment system including a headlight optical axis aiming measuring apparatus according to a first embodiment of this invention, comprises: a conveyor 1 conveying an unadjusted vehicle 2 leftwards as viewed in FIG. 1, a pair of headlight optical axis aiming measuring units 3, each of which is disposed to one side of the conveyor 1 for application to a right or left headlight installed in the unadjusted vehicle 2, two industrial robots 4, each of which holds one of the headlight axis aiming measuring units 3, two electrically operated screwdriver units 5, each of which is installed in the end of a working arm of one of the industrial robots 4, a robot control unit 6 for the industrial robots 4, and a headlight-aiming adjustment control unit 7 for controlling the robot control unit 6 and the screwdriver units 5.

The conveyor 1 includes a car-truck 8 positioning the unadjusted vehicle 2 and stops the movement of the car-truck 8 when the car-truck 8 reaches a given headlight-aiming adjustment position.

Each of the headlight optical axis aiming measuring units 3 has a measuring head 9 for measuring headlight optical axis orientation installed in the end of a measuring arm 10 swinging in the direction of movement of the car-truck 8. The measuring arm 10 is supported by the body 11 of each of the headlight axis aiming measuring units 3. The measuring arm 10 swings rightwards as viewed in FIG. 1 to one of the rectangular headlights 12 in order for the measuring head 9 to come into contact with the surface of a front lens or glass reaches the headlight-aiming adjustment position. In addition, the measuring arm 10 can swing leftwards as viewed in FIG. 1 to allow the unadjusted vehicle 2 to be conveyed leftwards as shown in FIG. 1. The detailed description of the measuring head 9 will follow later.

Each of the industrial robots 4 moves the screwdriver unit 5 up to adjuster screws 13 and 14 of the headlight 12 (see FIG. 2) alternatingly in response to instructions from the robot control unit 6. The screwdriver units 5 tighten or loosen the adjuster screws 13 and 14 according to instructions from the headlight-aiming adjustment control unit 7.

Figure 2:
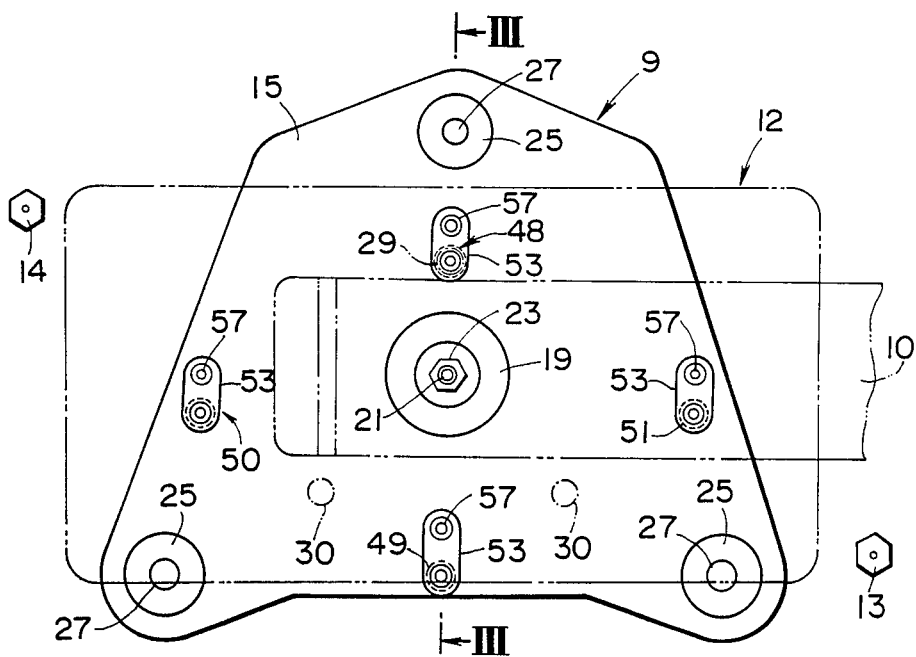
FIG. 2 is a front elevation of a headlight optical axis aiming measuring head used in the checking apparatus of FIG. 1.
Figure 3:
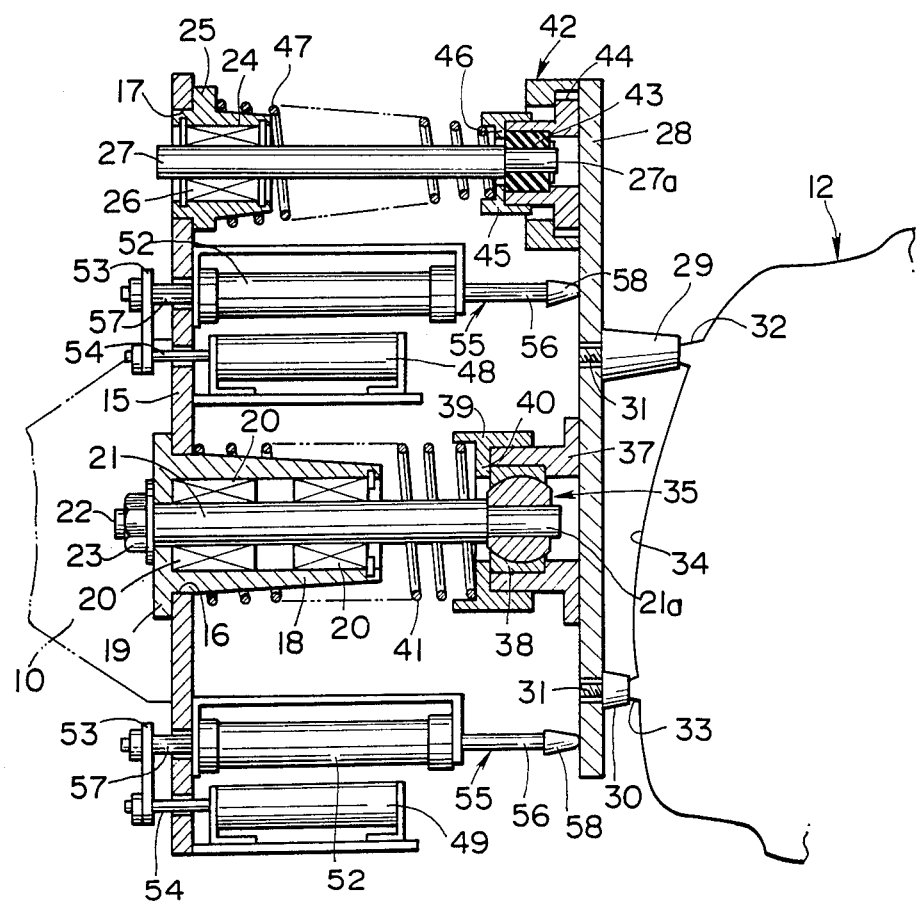
FIG. 3 is a longitudinal section taken along the line III—III in FIG. 2.

As shown in FIGS. 2 and 3, the measuring head 9 comprises an essentially trapezoidal reference plate 15 fixed to the end of the measuring arm 10 of the headlight optical axis aiming measuring unit 3. The reference plate 15 includes a central opening 16 and three openings 17 each located at the apices of a regular triangle with the central opening 16 at its center.

An essentially cylindrical bearing case 18 which has an annular flange 19 at its outer edge is fitted into and fixed to the central opening 16. the flange 19 is fixed to the outer surface of the reference plate 15. The bearing case 18 retains two separated bearings 20 in place. A central guide rod 21 axially slidably supported by both bearings 20 passes through the flange 19 and the bearing case 18. Thus, the central guide rod 21 is accurately movable perpendicularly to the reference plate 15. The outer end of the central guide rod 21 remote from this headlight 12 terminates at a threaded portion2 2 onto which a stop nut 23 is threaded. The underside of the stop nut 23 abuts the front surface of the flange 19 via a washer.

Three essentially cylindrical bearing cases 24 are respectively fitted into and fixed to the openings 17. Each of the bearing cases 24 has an outer flange 25 near its outer edge. The flange 25 is fixed to the inner surface of the reference plate 15. The bearing case 24 retains a single bearing 26. An auxiliary guide rod 27 axially slidably supported by the bearing 26 passes through the bearing case 24. Thus, each of three guide rods 27 is movable accurately perpendicularly to the reference plate 15.

As shown in FIGS. 2 and 3, the measuring head 9 also comprises an inclination-sensitive plate 28 which is of essentially the same shape as the reference plate 15. The inclination-sensitive plate 28 is opposed to the reference plate 15 and connected to front ends 21a and 27a of the central guide rod 21 and the auxiliary guide rods 27 remote from the reference plate 15. The inclination-sensitive plate 28 has one upper aiming pad 29 which has the shape of a right truncated cone and two lower aiming pads 30 which also have the shape of right truncated cones and are shorter than the upper aiming pad 29. Each of the upper aiming pad 29 and lower aiming pads 30 has a threaded portion 31 projecting from its larger end face and threaded into the inclinationsensitive plate 28. The smaller end faces of the respective upper aiming pad 29 and lower aiming pads 30 are brought into contact with front plane surface of an upper boss 32 and lower bosses 33 (or the other area of the surface 34 if the surface 34 has no bosses), all of which are formed on the surface 34 of the front lens of the headlight 12 due to the polish of the front lens, when the measuring head 9 measures the optical axis aiming of the headlight 12.

A ball joint 35 is disposed between the center of the inclination-sensitive plate 28 and the front end 21a of the central guide rod 21. A ball 36 is fixedly mounted on the front end 21a of the central guide rod 21. A cylindrical ball retainer 37 retaining the ball 35 via a ring 38 is fixed to the center of the inclination-sensitive plate 28. An annular cap 39 with an inner flange 40 is fixedly fitted onto a free end of the ball retainer 37. The flange 40 fixes the ring 38 in place in cooperation with a shoulder formed in the inner surface of the ball retainer 37. The flange 40 also seats one end of a cylindrical compression spring 41 surrounding the central guide rod 21 and the bearing case 18. The other end of the compression spring 41 seats on the reference plate 15.

Three flexible joints 42 are respectively disposed between three corners of the inclination-sensitive plate 28 and the respective front ends 27a of the auxiliary guide rods 27. A bushing 43 made of rubber is fixedly fitted onto the front end 27a of each of the auxiliary guide rods 27. A cylindrical bushing-retainer 44 retaining the bushing 43 is fixed to the inclination-sensitive plate 28. An annular cap 45 with an inner flange 46 is fixedly fitted onto a free end of the bushing retainer 44. The flange 46 retains the bushing 43 similarly to the flange 40 of the cap 39. The flange 46 also seats one end of a conical compression spring 47 surrounding each of the auxiliary guide rods 27 and each of the bearing cases 24. The other end of the compression spring 47 seats on the flange 25 of the bearing case 24.

Thus, the inclination-sensitive plate 28 is supported resiliently relative to the reference plate 15 by the compression springs 41 and 47. Under zero load, the inclination-sensitive plate 28 assumes a normal position in which it lies parallel to the reference plate 15.

As shown in FIG. 2, a pair of linear potentiometers 48 and 49 aligned vertically and a pair of linear potentiometers 50 and 51 aligned horizontally are all installed on the reference plate 15 and extend towards the inclination-sensitive plate 28. All of the potentiometers 48, 49, 50 and 51 are located at the apices of an approximate rhombus surrounding the central opening 16 of the reference plate 15. Each of the potentiometers 48, 49, 50 and 51 mates via a connecting plate 53 with a pneumatic cylinder 52 (i.e., a linear actuator) which is also installed on the reference plate 15 and which extends towards the inclination-sensitive plate 28. In detail, a particular potentiometer 48 has a measuring rod 54 passing through an opening in the reference plate 15. A mating pneumatic cylinder 52 has a piston rod 55 including a first stem portion 56 extending to the inclination-sensitive plate 28 and a second stem portion 57 projecting through an opening in the reference plate 15. The piston rod 55 is continuously biased towards the inclination-sensitive plate 28. The first stem portion 56 has a sensitive point 58 in contact with the inner surface of the inclination-sensitive plate 28. The second stem portion 57 is fixedly connected via the connecting plate 53 to the measuring rod 54 of the potentiometer 48. Thus the respective piston rods 55 can accurately follow the inclination of the inclination-sensitive plate 28 so that each of the potentiometers 48, 49, 50 and 51 detects displacement of a corresponding part of the inclination-sensitive plate 28.

Figure 4:
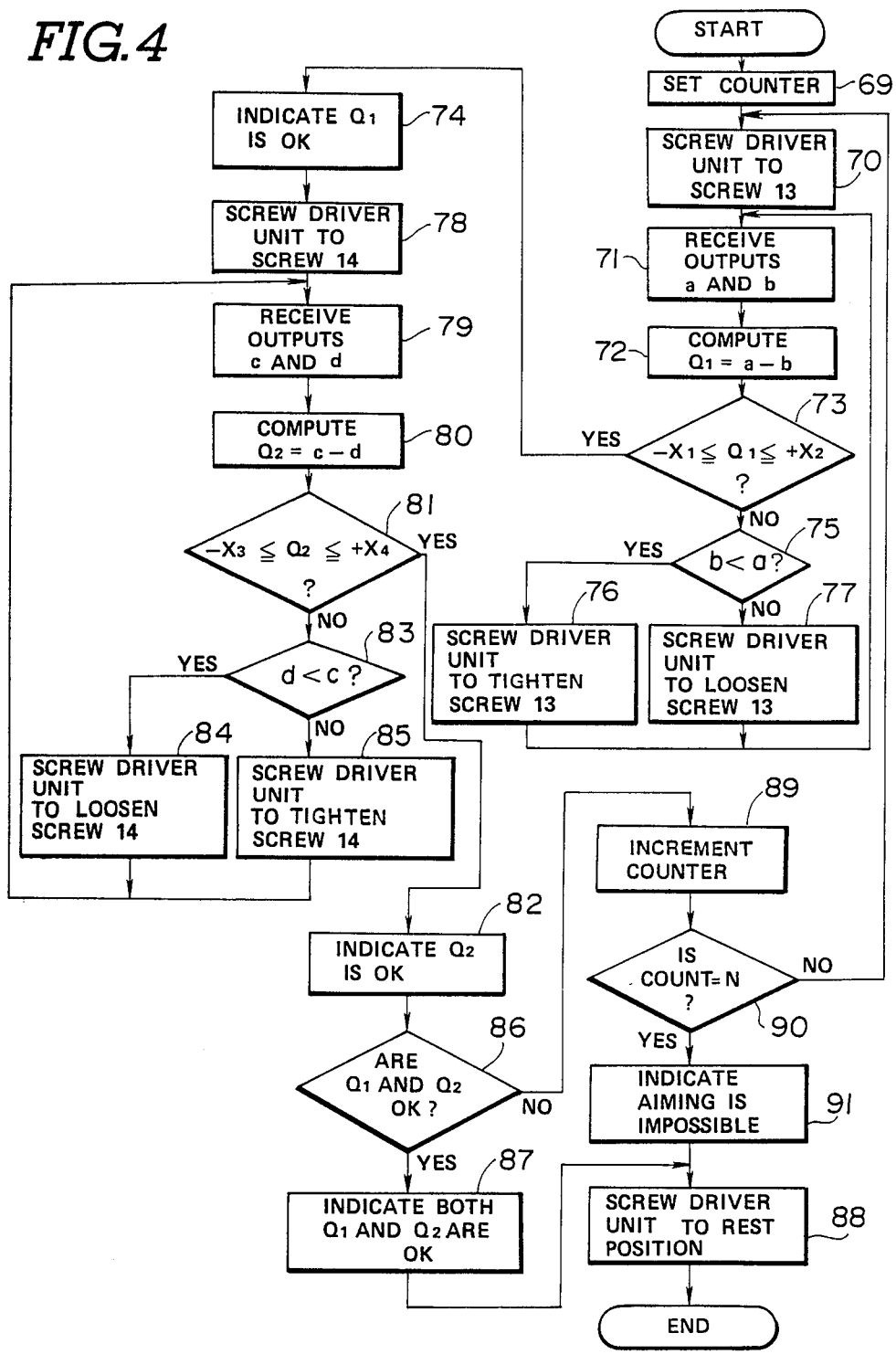
FIG. 4 is a flowchart for the checking apparatus of FIG. 1.

The operation of the headlight optical axis aiming measuring apparatus according to the first embodiment of this invention will be described with reference to FIGS. 1 and 4.

First, after the unadjusted vehicle 2 is set at the given headlight-aiming adjustment position by the car-truck 8, each of the measuring arms 10 swings into contact with the corresponding right or left headlight 12 so that the upper aiming pads 29 and the lower aiming pads 30 abut perpendicularly the front surfaces of the upper boss 32 and lower bosses 33 on the front lens surface 34 of the headlight 12.

The inclination-sensitive plate 28 will cant relative to the reference plate 15 in accordance with the possible deviation of the inclination of the front lens of the headlight 12. The resulting inclination of the inclination-sensitive plate 28 moves corresponding measuring rods 54 of the potentiometers 48, 49, 50 and 51 via the respective piston rods 55 of the pneumatic cylinders 52.

The first step 69 of the program sets an iteration counter, the use of which will be explained with regard to a later step 89.

At the next step 70, executed concurrently with the abutment of the pads 29 and 30, the industrial robot 4 moves the screwdriver unit 5 up to the adjuster screw 13 in response to instructions from the robot control unit 6 in order to adjust the vertical inclination of the headlight 12. At a step 71 subsequent to the step 70, the headlight-aiming adjustment control unit 7 receives respective outputs a and b of the vertically aligned potentiometers 48 and 49 via an A/D converter (not shown) of the headlight-aiming adjustment control unit 7. At a step 72 subsequent to the step 71, a central processing unit (not shown) of the headlight-aiming adjustment control unit 7 computes a vertical deviation value $Q_1 (=a-b)$. At a step 73 subsequent to the step 72, the headlight-aiming adjustment control unit 7 checks whether or does not the vertical deviation $Q_1$ falls within a target range: $-X_1 \leq Q_1 \leq +X_2$ where the values $X_1$ and $X_2$ are both positive.

When the vertical deviation $Q_1$ falls within this target range, the headlight-aiming adjustment control unit 7 proceeds to a step 74. At this step, the headlight-aiming adjustment control unit 7 indicates that the vertical headlight aiming is acceptable. On the other hand, when the vertical deviation $Q_1$ falls outside this target range, the headlight-aiming adjustment control unit 7 proceeds to a step 75. At this step, the headlight-aiming adjustment control unit 7 checks whether the vertical deviation $Q_1$ is positive or negative (i.e., b<a or b>a).

When the value b is smaller than the value a, the headlight-aiming adjustment control unit 7 proceeds to a step 76. At this step, the headlight-aiming adjustment control unit 7 instructs the screwdriver unit 5 to tighten the adjuster screw 13 (i.e., turn the screw 13 clockwise in FIG. 2) so that the optical axis of the headlight 12 is tilted down (b<z means that the optical axis of the headlight 12 in question is canted upward relative to the normal aiming of the headlight optical axis).

On the other hand, when the value b is greater than the value 1, the headlight-aiming adjustment control unit 7 proceeds to a step 77. At this step, the headlight-aiming adjustment control unit 7 instructs the screwdriver unit 5 to loosen the adjuster screw 13 (i.e., turn the screw 13 counter-clockwise in FIG. 2) so that the optical axis of the headlight 12 tilts upwards. The headlight-aiming adjustment control unit 7 repeats the cycle consisting of the steps 71, 72, 73, 75 and 77, or the steps 71, 72, 73, 75 and 76 until the vertical deviation $Q_1$ falls within the target range.

At a step 78 subsequent to the step 74, the industrial robot 4 moves the screwdriver unit 5 to the adjuster screw 14 in response to instructions from robot control unit 6 in order to adjust the right-to-left aiming of the headlight 12. At a step 79 subsequent to the step 78, the headlight-aiming adjustment control unit 7 receives respective outputs c and d of the horizontally aligned potentiometers 50 and 51 via the A/D converter of the headlight-aiming adjustment control unit 7. At a step 80 subsequent to the step 79, the central processing unit of the headlight-aiming adjustment control unit 7 computes a horizontal deviation value $Q_2 (=c-d)$. At a step 81 subsequent to the step 80, the headlight-aiming adjustment control unit 7 checks whether or does not the horizontal deviation $Q_2$ falls within a target range : $-X_3 \leq Q_2 \leq +X_4$ where the values $X_3$ and $X_4$ both are positive. When the horizontal deviation $Q_2$ falls within this target range, the headlight-aiming adjustment control unit 7 proceeds to a step 82. At this step, the headlight-aiming adjustment control unit 7 indicates that the horizontal headlight aiming is acceptable.

On the other hand, when the horizontal deviation $Q_2$ falls outside this target range, the headlight-aiming adjustment control unit 7 proceeds to a step 83. At this step, the headlight-aiming adjustment control unit 7 checks whether the horizontal deviation $Q_2$ is positive or negative (i.e., d<c or d>c).

When the value of d is smaller than the value c, the headlight-aiming adjustment control unit 7 proceeds to a step 84. At this step, the headlight-aiming adjustment control unit 7 instructs the screwdriver unit 5 to loosen the adjuster screw 14 (i.e. turn the screw 14 counter-clockwise in FIG. 2) so that the optical axis of the headlight 12 pivots rightwards (d<c means that the optical axis of the headlight 12 in question is canted leftward from the normal aiming of the headlight optical axis).

On the other hand, when the value d is greater than the value c, the headlight-aiming adjustment control unit 7 proceeds to a step 85. At this step, the headlight-aiming adjustment control unit 7 instructs the screwdriver unit 5 to tighten the adjuster screw 14 (i.e. turn the screw 14 clockwise in FIG. 2) so that the optical axis of the headlight 12 pivots leftwards. The headlight-aiming adjustment control unit 7 repeats the cycle consisting of the steps 79, 80, 81, 83 and 84, or the steps 79, 80, 81, 83 and 85 until the horizontal deviation $Q_2$ falls within its target range.

At a step 86 subsequent to the step 82 as described above, the headlight-aiming adjustment control unit 7 once more checks whether or does not the respective vertical and horizontal deviations $Q_1$ and $Q_2$ fall within the target ranges, because the horizontal headlight-aiming adjustment process may cause deviation of the vertical headlight-aiming previously corrected.

Once both the vertical and horizontal deviations $Q_1$ and $Q_2$ are OK, the headlight-aiming adjustment control unit 7 proceeds to a step 87. At this step, the headlight-aiming adjustment control unit 7 indicates that both the vertical and horizontal deviations $Q_1$ and $Q_2$ are OK. At a last step 88 subsequent to the step 87, the headlight-aiming adjustment control unit 7 instructs the industrial robot 4 via the robot control unit 6 to move the screwdriver unit 5 to a rest position.

On the other hand, if either one or both of the vertical and horizontal deviations $Q_1$ and $Q_2$ fall outside the corresponding target ranges, the headlight-aiming adjustment control unit 7 proceeds to a step 89. At this step, the headlight-aiming adjustment control unit 7 increments the counter (not shown) set in step 69 in order to count the number of iterations of the program from the step 70 up to the step 86.

At a step 90 subsequent to the step 89, the headlight-aiming adjustment control unit 7 checks whether or not this count has reached a given number N (.e.g, 2-4). If this count ever reaches N, the headlight-aiming adjustment control unit 7 proceeds to a step 91. At this step, the headlight-aiming adjustment control unit 7 indicates that the headlight-aiming adjustment is impossible, because, for example, of abnormal installation of the headlight 12. Then, the headlight-aiming adjustment control unit 7 proceeds to the last step 88 as described above. On the other hand, before this count reaches N, the headlight-aiming adjustment control unit 7 returns to the step 70 and repeats the program from the step 70 to the step 86 while the industrial robot 4 repeats its work in accordance with this program, until the count reaches N or both deviation values $Q_1$, $Q_2$ fall within their respective target ranges.

Alternatively, at step 86, if the vertical deviation $Q_1$ is OK but the horizontal deviation $Q_2$ is not, the headlight-aiming adjustment control unit 7 may bypass the loop from the step 70 up to the step 73. On the other hand, if the horizontal deviation $Q_2$ is OK but the vertical deviation $Q_1$ is not, the headlight-aiming adjustment control unit 7 may bypass the routine from the steps 78 up to 81.

SECOND EMBODIMENT

Figure 5:
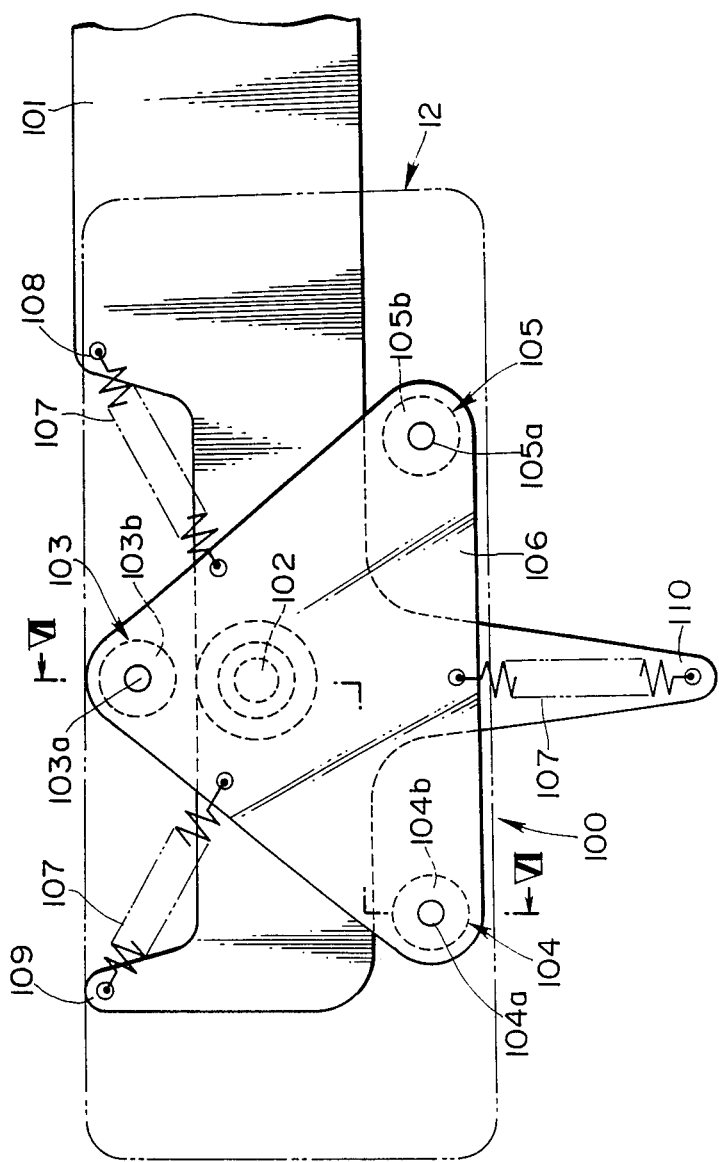
FIG. 5 is a front elevation of a headlight optical axis aiming measuring head according to a second embodiment of this invention.
Figure 6:
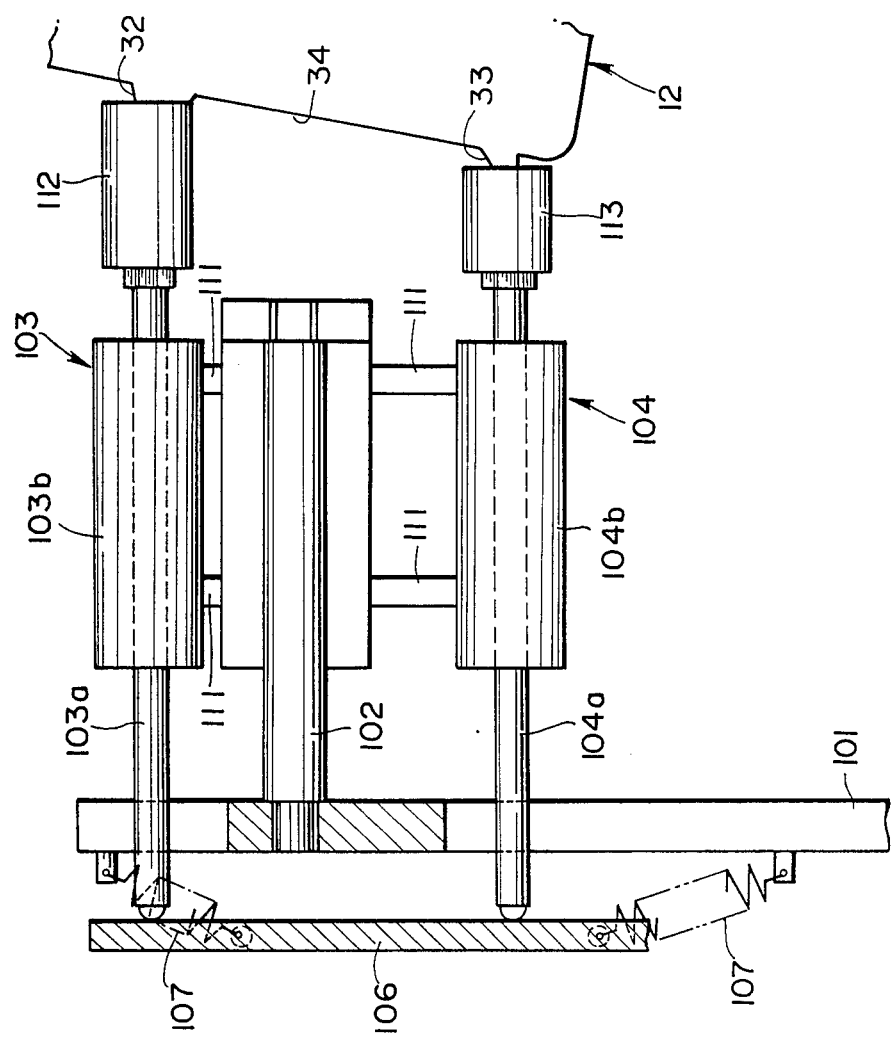
FIG. 6 is a longitudinal section taken along the line VI—VI in FIG. 5.

FIGS. 5 and 6 illustrate an alternative headlight optical axis aiming measuring head 100 according to a second embodiment of this invention.

This measuring head 100 comprises a reference plate 101 fixed to the end of a measuring arm 10, a support rod 102 fixed perpendicularly to the reference plate 101, three displacement sensors 103, 104 and 105 arranged at apices of a regular triangle and supported by the support rod 102, a triangular back plate 106 biasing three measuring rods 103a, 104a and 105a towards the headlight 12 being measured, and three tension springs 107.

As shown in FIG. 5, the reference plate 101 has a pair of upward projections 108 and 109 opposing each other across a spacing interval and has a single downward projection 109 midway between the upward projections 108 and 109 but along the opposite edge. The support rod 102 is also centered between projections 108 and 109 and has fixed arms 111 extending to respective read heads 103b, 104b and 105b of the displacement sensors 103, 104 and 105.

Each of the displacement sensors 103, 104 and 105 comprises a measuring rod 103a, 104a or 105a movable relative to a read head 103b, 104b or 105b, and the read heads 103b, 104b or 105b themselves fixed to the support rod 102 by means of the fixed arms 111. Each of the displacement sensors 103, 104 and 105 is a device in which the measuring rod 103a, 104a or 105a bears a magnetic grating composed of recorded sine waves of known wavelength and the corresponding read heads 103b, 104b or 105b electromagnetically read the displacement of the magnetic grating relative to the read heads 103b, 104b or 105b.

This type of a displacement sensor is well known; e.g., Magnescale (a trademark) available commercially. Alternatively, the displacement sensor 103, 104 or 105 may be a device employing an optical grating as a scale.

The front end of the measuring rod 103a has an upper aiming pad 112 which is to be in contact with and perpendicular to the front surface of the upper boss 32. The rear end of the measuring rod 103a passes through the reference plate 101, and is in contact with the back plate 106. The front end of the measuring rod 104a has a lower aiming pad 113 which is to be in contact with the lower boss 33. The rear end of the measuring rod 104 is similar to the rear end of the measuring rod 103a. The measuring rod 105 is identical to the measuring rod 104.

The tension springs 107 are installed between each of the projections 108, 109 and 110 and corresponding points on the back plate 106, thus biasing the back plate 106 towards the headlight 12 being measured.

In operation, as the pads 112 and 113 are brought into contact with the bosses 32 and 33, the respective measuring rods 103a, 104a and 105a are displaced in accordance with the inclination of the surface 34 of the front lens of the headlight 12. Possible vertical deviation of the headlight optical axis from the corresponding target range is computed from the outputs from the displacement sensor 103 and either of the displacement sensors 104 and 105. Possible horizontal deviation of the headlight optical axis from the corresponding target range is computed from the outputs from the displacement sensors 104 and 105.

THIRD EMBODIMENT

FIGS. 7 to 18 illustrate a headlight-aiming adjustment system including a headlight optical axis aiming measuring apparatus according to a third embodiment of this invention. In the following description, elements similar to those in the first embodiment of this invention will bear the same labels and description of similar elements will be omitted.

Figure 7:
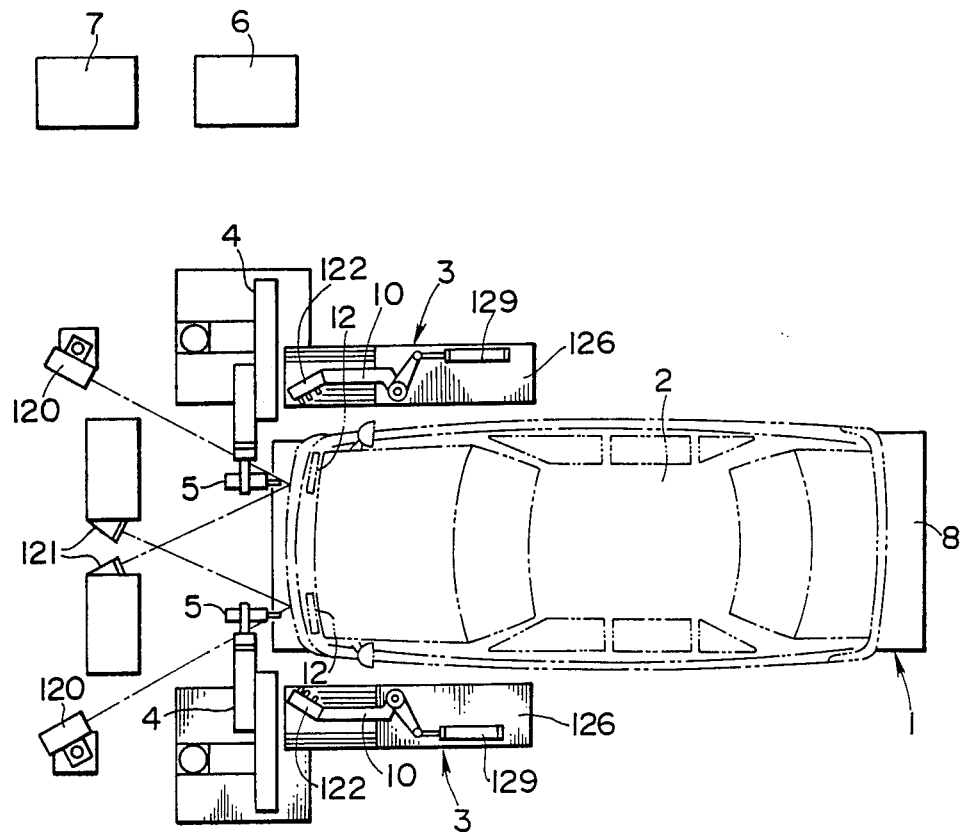
FIG. 7 is a diagram of a headlight-aiming adjustment system including a headlight optical axis aiming measuring head according to a third embodiment of this invention.

As shown in FIG. 7, the headlight-aiming adjustment system comprises a conveyor 1, a pair of headlight optical axis aiming measuring units 3, two industrial robots 4, two electrically operated screwdriver units 5, a robot control unit 6, a headlight-aiming adjustment control unit 7 including a memory 7a which stores compensation data for displacement sensor outputs in accordance with the type (e.g., a halogen lamp or not) and shape of headlights for various models of vehicles 2, a pair of lasers 120 directed at the right and left headlights 12 respectively, and a pair of laser light receiving elements 121, each dedicated to one of the lasers 120. An unadjusted vehicle 2 is positioned on a car-truck 8. Each of the headlight optical axis aiming measuring units 3 has a measuring head 122 installed at the end of a measuring arm 10 for measuring the headlight optical axis aiming. Each of the industrial robots 4 has a screwdriver unit 5 in which a DC motor 123 has a pulse encorder 124 (see FIG. 16) in order to control the degree of rotation of the screwdriver unit 5.

The characteristic of this screwdriver unit 5 are given in Table 1:

TABLE 1

| Pulse encorder | Frequency dividing ratio | Reduction ratio | Number of rotation per a pulse |
|---|---|---|---|
| 200 pulses | $\frac{1}{100}$ | $\frac{1}{25}$ | $\frac{1}{50}$ |

Thus, the screwdriver unit 5 rotates through 7.2° (360° ÷50) per pulse. The lead of each of adjuster screws 13 and 14 per pulse is 0.02 mm (=1 mm÷50) whenthe adjuster screws 13 and 14 have a 1 mm pitch. the screwdriver unit 5 can fine-adjust the headlight optical axis aiming when it receives an instruction for rotation from the headlight-aiming adjustment control unit 7.

Figure 8:
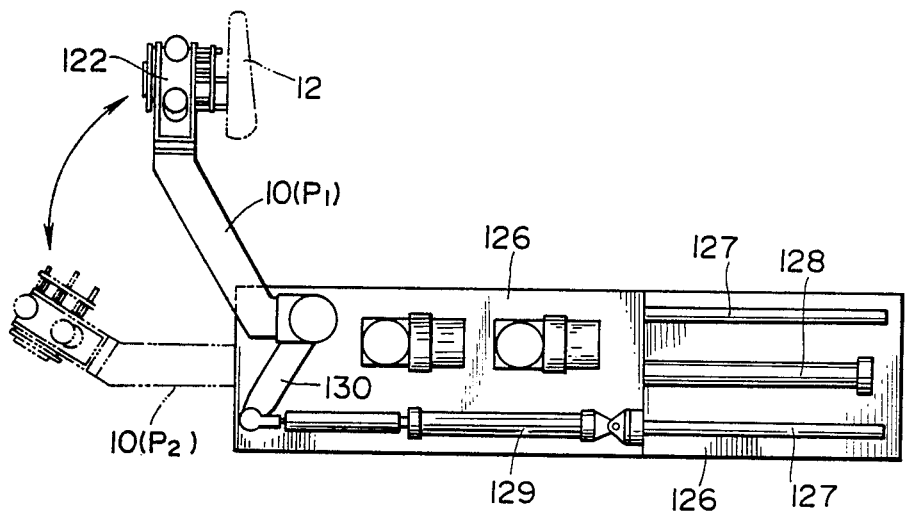
FIG. 8 is an enlarged plan view of the headlight optical axis aiming measuring unit of FIG. 7.
Figure 9:
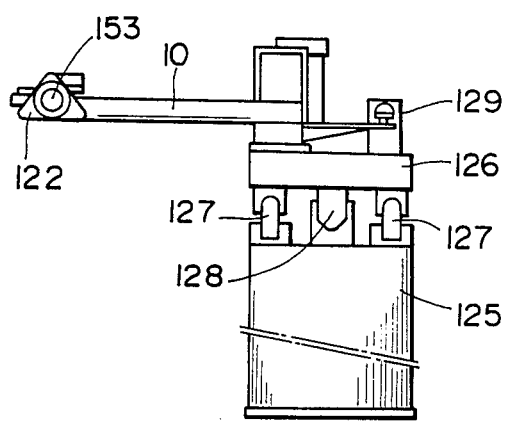
FIG. 9 is a front elevation of the headlight optical axis aiming measuring unit of FIG. 8.

As shown in FIGS. 8 and 9, the operating part of each of the headlight optical axis aiming measuring units 3 except the measuring head 122 comprises a base 125, a rectangular plate-like slide body 126 slidable along two guide rails 127 installed on the top surface of the base 125, and the above-described measuring arm 10. A linear actuator 128, e.g., hydraulic cylinder, installed between the guide rails 127 controls the extension and retraction of the slide body 126. A linear actuator 129, e.g., hydraulic cylinder, installed on the top surface of the slide body 126 horizontally pivots the measuring arm 10 via a lever 130 between a measurement position $P_1$ shown in solid line in FIG. 8 and a rest position $P_2$ shown in phantom lines in FIG. 8.

Figure 10:
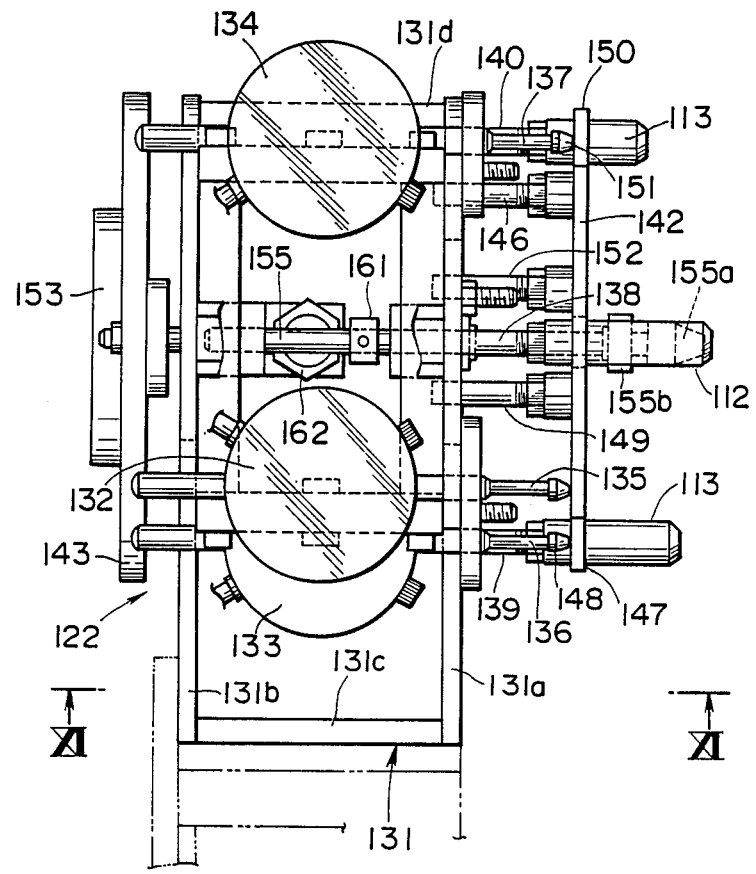
FIG. 10 is a detailed enlarged plan view of the headlight optical axis aiming measuring head of FIG. 7.
Figure 11:
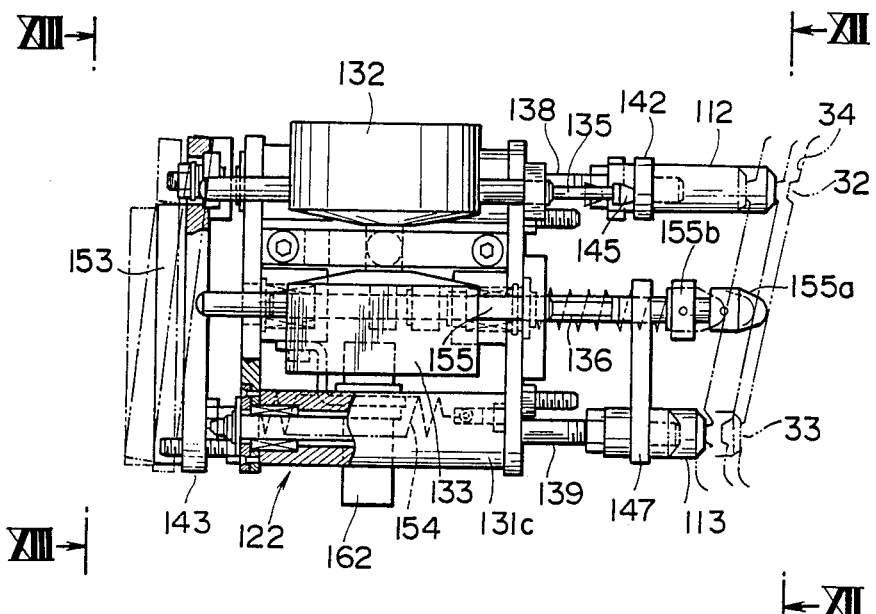
FIG. 11 is an elevation of the headlight optical axis aiming measuring head taken in the direction of the arrows XI in FIG. 10.

As shown in FIGS. 10 to 15, the measuring head 122 comprises a framework 131 consisting of a trapezoidal front plate 131a (see FIG. 12), a triangular rear plate 131b (see FIG. 13) parallel to the front plate 131a, and a pair of bridging plates 131c and 131d. As best shown in FIGS. 10 and 11, one upper displacement sensor 132 and two lower displacement sensors 133 and 134 are installed between the front plate 131a and the rear plate 131b. Each of the displacement sensors 132, 133 and 134 comprises a dial gauge and a linear potentiometer with a measuring rod 135, 136 or 137.

Figure 12:
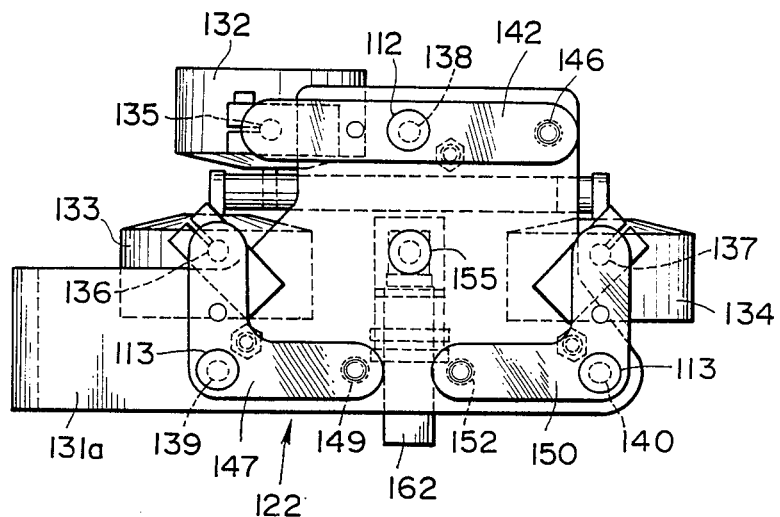
FIG. 12 is an elevation of the headlight optical axis aiming measuring head taken in the direction of the arrows XII in FIG. 11.
Figure 14:
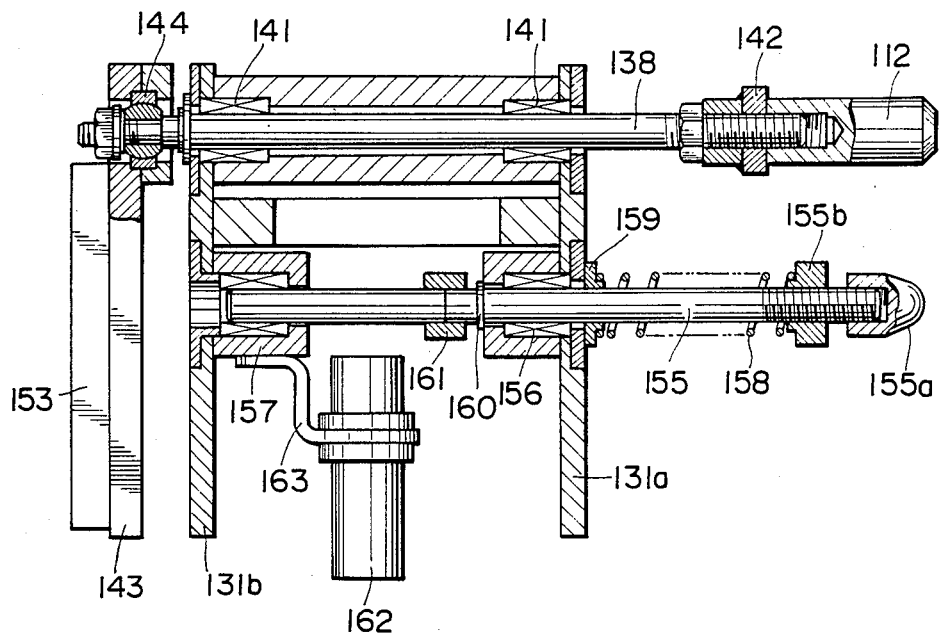
FIG. 14 is a section through the headlight optical axis aiming measuring head taken along the line XIV—XIV in FIG. 13.

As shown in FIG. 12, an upper guide rod 138 and two loer guide rods 139 and 140 are installed near the measuring rods 135, 136 and 137. As shown in FIG. 14, the upper guide rod 138 passes axially slidably through the front plate 131a and the rear plate 131b via front and rear linear bearings 141, (e.g., a linear ball bearing). The front end of the upper guide rod 138 is threaded into combined aiming pad 112 and first displacement-transmissive plate 142. The rear end of the upper guide rod 138 couples with a back plate 143 behind the rear plate 131b of the framework 131 via a ball joint 144. As shown in FIG. 12, the first displacement-transmissive plate 142 is straight. The center of the first displacement-transmissive plate 142 is fixed to the front end of the upper guide rod 138. A rear surface of one end of the first displacement-transmissive plate 142 (a left end as viewed in FIG. 12) is in contact with the tip 145 of the front end of the measuring rod 135. The rear face of the other end of the first displacement-transmissive plate 142 (the right-hand end as viewed in FIG. 12) is fixed to one end of an auxiliary guide rod 146, the other end of which passes through an opening (not shown) in the front plate 131a of the framework 131.

Figure 15:
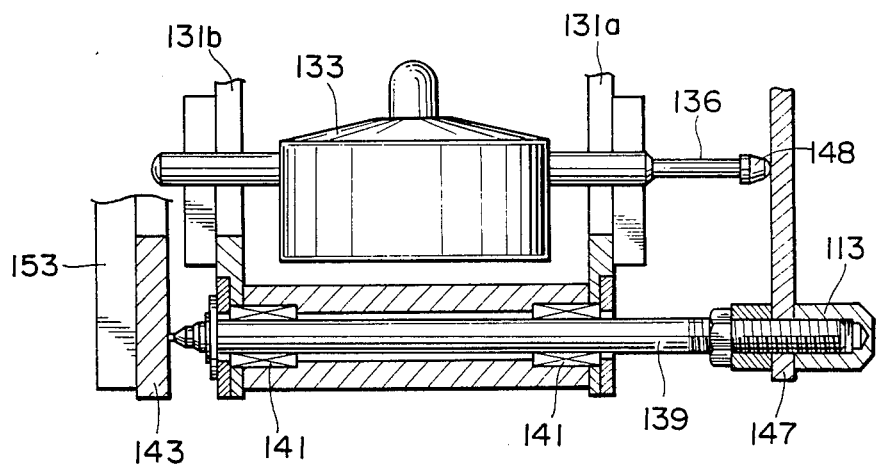
FIG. 15 is a section through the headlight optical axis aiming measuring head taken along the line XV—XV in FIG. 13.
Figure 16:
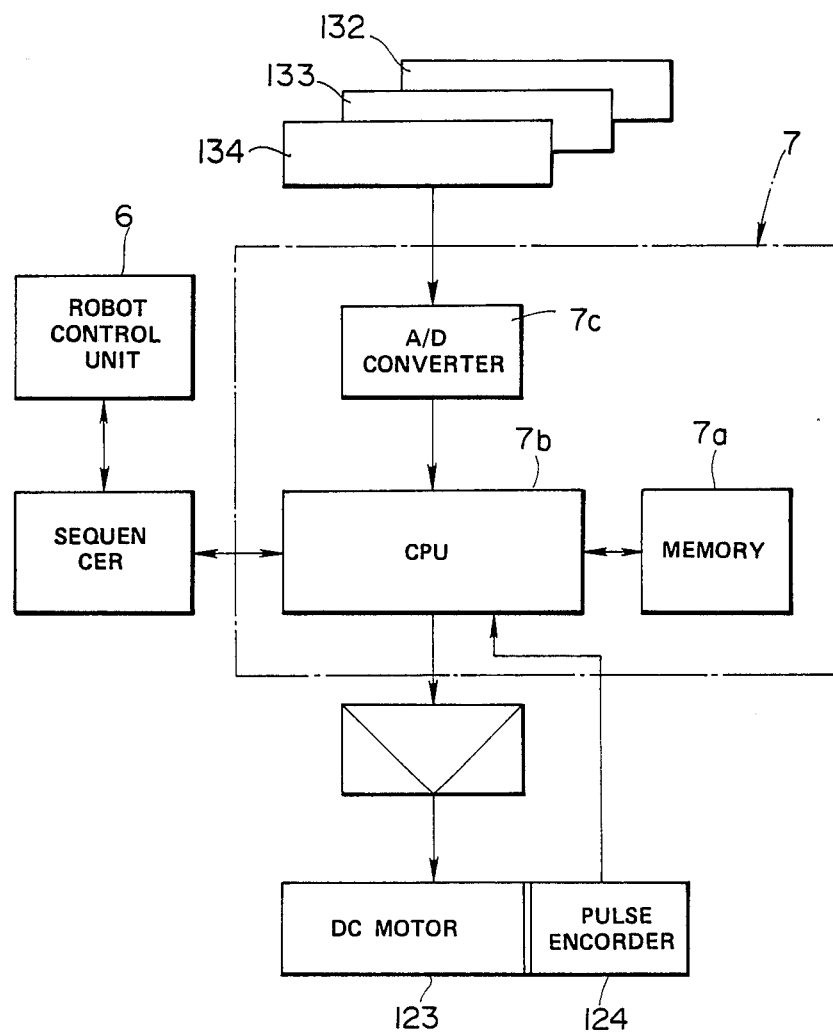
FIG. 16 is a block diagram of the headlight optical axis aiming measuring unit of FIG. 7.
Figure 17:
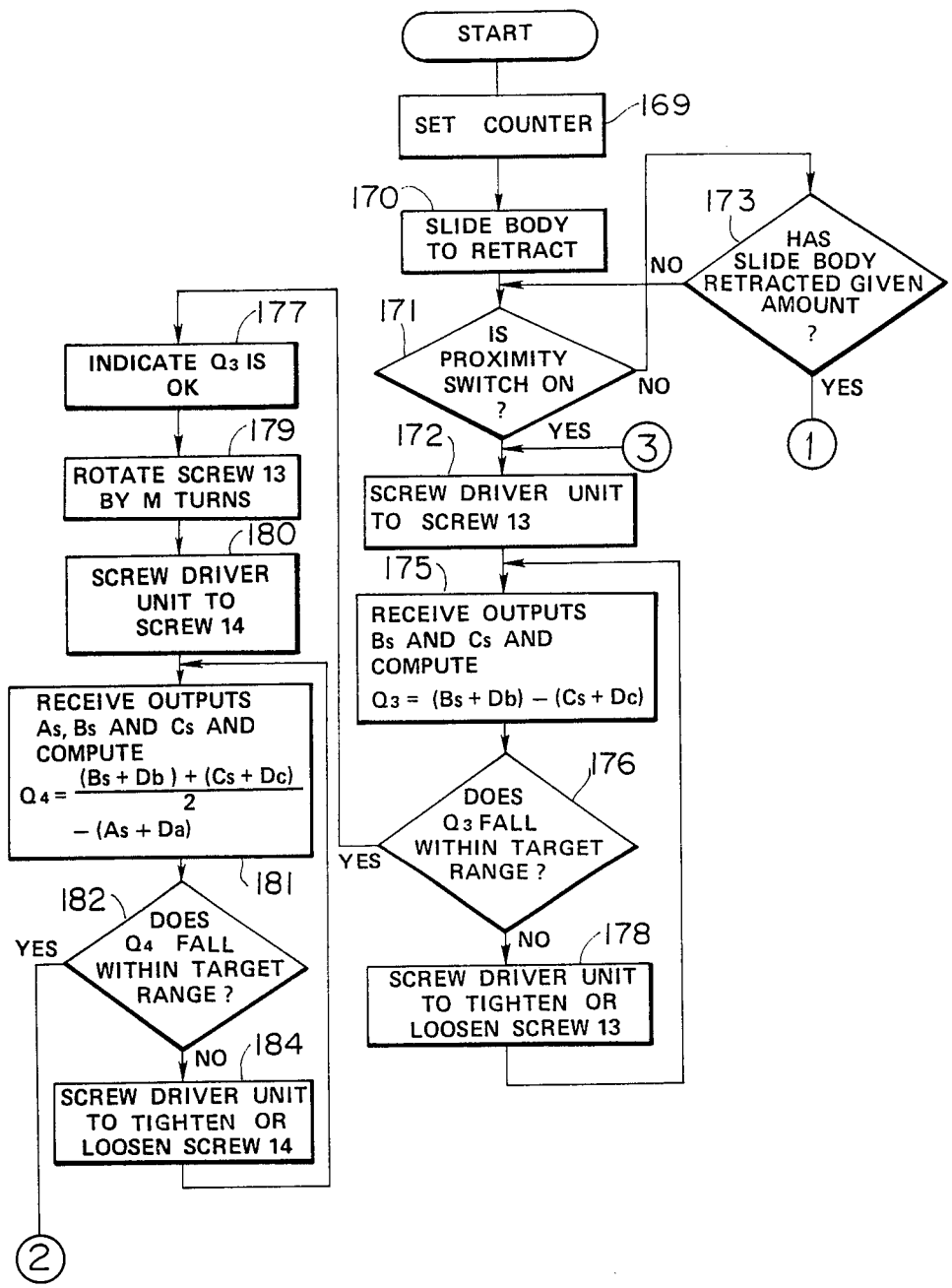
FIG. 17 is a part of a flowchart of a headlight-aiming adjustment performed by the headlight-aiming adjustment system of FIG. 7.
Figure 18:
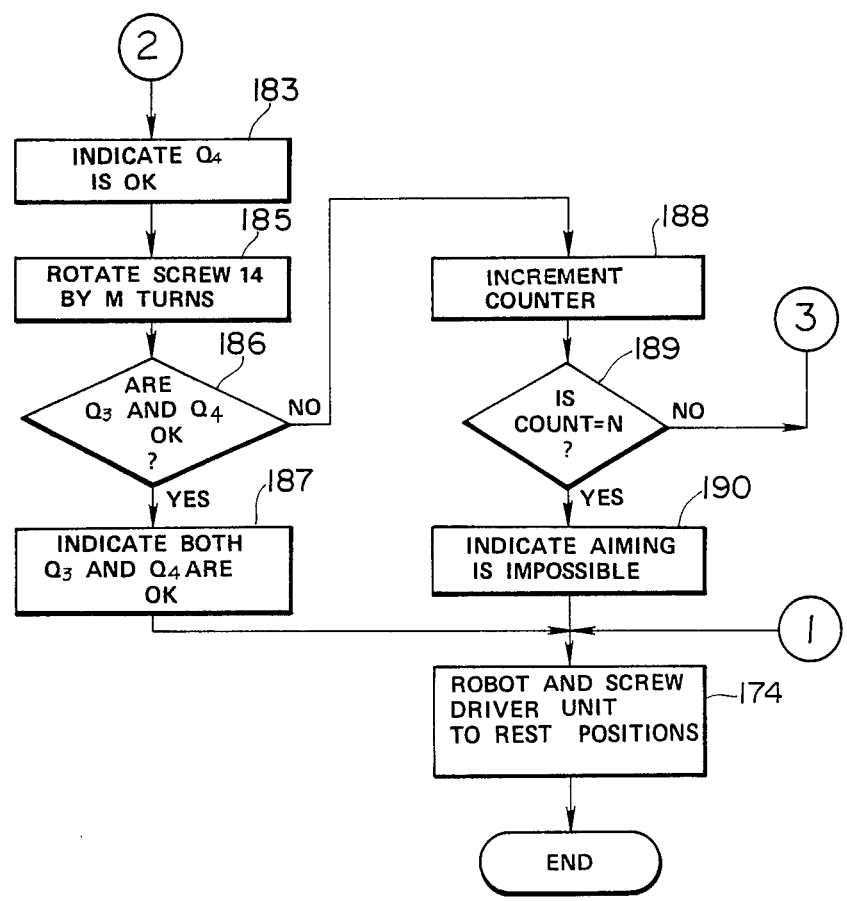
FIG. 18 is the rest of the flowchart started in FIG. 17 and continuing from the three encircled points 1, 2 and 3.

As shown in FIG. 15, the lower guide rod 139 also passes axially slidably through the front plate 131a and the rear plate 131b via front and rear linear bearings 141. The front end of the lower guide rod 139 is threaded into combined aiming pad 113 and second displacement-transmissive plate 147. The rear end of the lower guide rod 139 is in contact with the lower part of the front face of the back plate 143. As shown in FIG. 12, the second displacement-transmissive plate 147 is L-shaped. The center of the second displacement-transmissive plate 147 is fixed to the front end of the lower guide rod 139. The rear face of the upper part of the second displacement-transmissive plate 147 is in contact with the tip 148 of the front end of the measuring rod 136. The lower part of the second displacement-transmissive plate 147 extends towards the lower guide rod 140. The rear face of this lower part of the second displacement-transmissive plate 147 is fixed to one end of an auxiliary guide rod 149, the other end of which passes through an opening (not shown) in the front plate 131a of the framework 131.

The lower guide rod 140 is identical to the lower guide 139, excep that its front end is threaded into combined aiming pad 113 and third displacement-transmissive plate 150. As shown in FIG. 12, the third displacement-transmissive plate 150 is mirror-symmetrical with the second displacement-transmissive plate 147. The center of the third displacement-transmissive plate 150 is fixed to the front end of the lower guide rod 140. The rear face of the upper part of the third displacement-transmissive plate 150 is in contact with the tip 151 of the front end of the measuring rod 137. The rear face of this lower end of the third displacement-transmissive plate 150 is fixed to one end of an auxiliary guide rod 152, the other end of which passes through an opening (not shown) in the front plate 131a of the framework 131.

Figure 13:
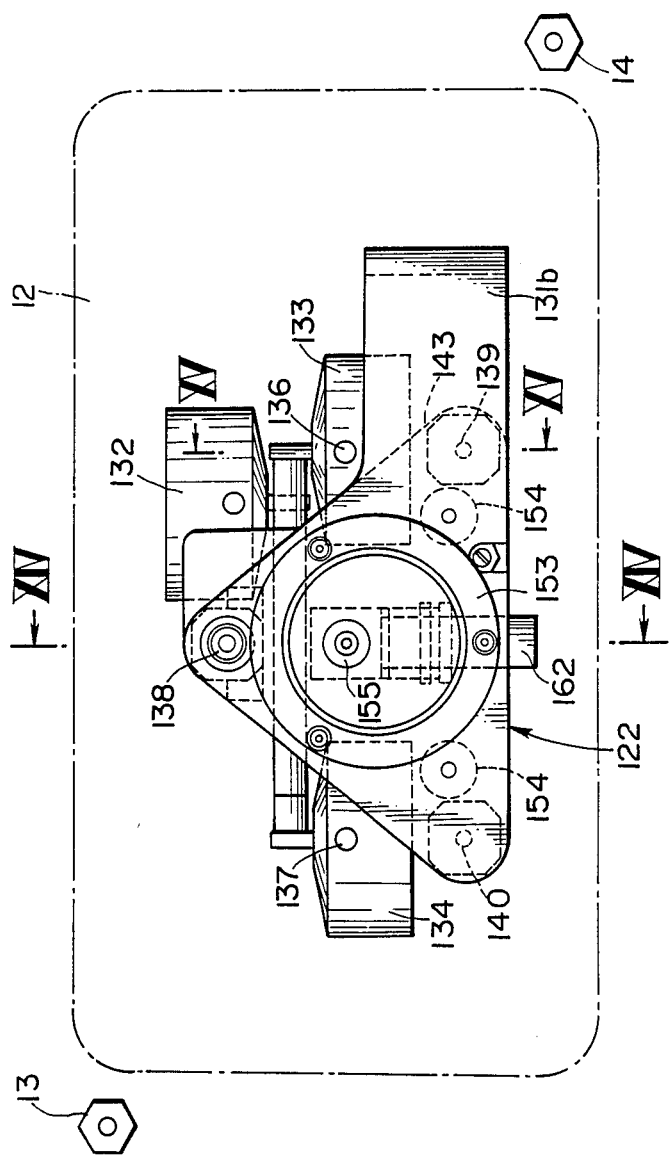
FIG. 13 is an elevation of the headlight optical axis aiming measuring head taken in the direction of the arrows XIII in FIG. 11.

As best shown in FIG. 13, the rear face of the above-described back plate 143 has a mirror plate 153 which will reflect the laser light emitted by the lasers 120. At two points near its lower edge, the back plate 143 anchors the ends of a pair of tension springs 154, the other ends of which are connected to the front plate 131a of the framework 131. Thus, the back plate 143 continuously biases the guide rods 139 and 140 forwards (rightward as viewd in FIG. 11). On one hand, possible linear displacements of the guide rods 138, 139 and 140 are respectively translated to the measuring rods 135, 136 and 137 via the displacement-transmissive plates 142, 147 and 150 and detected by the displacement sensors 132, 133 and 134. On the other hand, the possible linear displacements of the guide rods 138, 139 and 140 cause the back plate 143 and the mirror plate 153 to tilt.

As shown in FIG. 13, a central guide rod 155 is installed near the center of the triangle defined by the axes of the guide rods 138, 139 and 140. As shown in FIG. 14, the central guide rod 155 passes axially slidably through the front plate 131a and the rear plate 131b of the framework 131 via a front linear bearing 156 mounted on the inner face of the front plate 131a and a rear linear bearing 157 mounted on the inner face of the rear plate 131b. The front end of the central guide rod 155 is threaded into an aiming pad 155a and a spring reatiner 155b. A compression spring 158 is seated between the spring retainer 155b and a spring retainer 159 mounted on the outer surface of the front plate 131a of the framework 131. An intermediate portion of the central guide rod 155 has a snap ring 160 abutting and separating from the rear face of the front linear bearing 156 in order to limit the forward travel of the central guide rod 155 from the front plate 131a of the framework 131. A dog 161 is installed as a switch acutator on the central guide rod 155 behind and near the snap ring 160.

A proximity switch 162 is installed under the central guide rod 155 by means of a bracket 163 extending from the rear linear bearing 157. This proximity switch 162 is actuated ON and OFF by the dog 161.

The operation of the headlight optical axis aiming measuring apparatus according to the third embodiment of this invention will be described with reference to FIGS. 7 to 18.

The slide body 126 waits at its forward-most limit of extension from the base 125 and the measuring arm 10 waits at the rest position P$_2$ as seen in FIG. 8 until the unadjusted vehicle 2 reaches and comes to rest at the given headlight-aiming adjustment position.

The program starts at step 169, at which a counter is set as instep 69 in the first embodiment.

At the next step 170 performed concurrently with the movement of the measuirng arms 10 to the measurment positions P$_1$, the headlight-aiming adjustment control unit 7 instructs the slide body 126 to retract. The slide body 126 continues to retract until the pads 112, 113 and 156 abut the front lens of the headlight 12. The dog 161 on the central guide rod 155 actuates the proximity switch 162 so as to turn it on. At a step 171 subsequent to the step 170, the headlight-aiming adjustment control unit 7 checks whether or not the proximity switch 162 is on.

When the proximity switch 162 is on, i.e. closed, the slide body 126 stops since closure of the proximity switch 162 indicates that the spatial relation between each of the displacement sensors 132, 133 and 134 and the front lens 34 of the headlight 12 is suitable for measurement. The headlight-aiming adjustment control unit 7 proceeds to a step 172. At this step, the headlight-aiming adjustment control unit 7 instructs the industrial robot 4 via the robot control unit 6 to move the screwdriver unit 5 to the adjuster screw 13 to perform the right-to-left adjustment of the headlight optical axis. Since the location of the adjuster screw 13 varies in accordance with the model of the vehicle 2, data specifying the location of the adjustor screw 13 for each type of vehicle 2 are supplied to each of the industrial robots 4.

On the other hand, when the proximity switch 162 is off, the headlight-aiming adjustment control unit 7 proceeds to a step 173. At this step, the headlight-aiming adjustment control unit 7 checks whether or not the slide body 126 has retracted to a given extent.

When the slide body 126 has retracted the given distance while the proximity switch 162 remains open, the headlight-aiming adjustment control unit 7 proceeds to a last step 174 (see FIG. 18) at which it instructs the industrial robot 4 via the robot control unit 6 to move to a rest position and instructs the measuring head 122 to move to the rest position P$_2$, e.g., since an unadjusted vehicle 2 may have been removed at a previous step in a manufacturing line. On the other hand, if the slide body 126 has not yet retracted to the given extent, the headlight-aiming adjustment control unit 7 returns to the step 171.

At a step 175 subsequent to the step 172, a central processing unit or CPU 7b of the headlight-aiming adjustment control unit 7 receives outputs B$_s$ and C$_s$ of the displacement sensors 134 and 133 via an analog/digital or A/D converter 7c of the headlight-aiming adjustment control unit 7 and retrieves compensation data D$_b$ and D$_c$ corresponding to the respective outputs of the displacement sensors 134 and 133 from the memory 7a after the screwdriver unit 5 has been positioned opposite the adjuster screw 13. Then, the headlight-aiming adjustment control unit 7 computes a horizontal deviation value Q$_3$ in accordance with the following equation (1):

$$Q_3 = (B_s + D_b) - (C_s + D_c) \tag{1}$$

At a step 176 subsequent to the step 175, the headlight-aiming adjustment control unit 7 checks whether or not the horizontal deviation Q$_3$ falls within a target range.

When the horizontal deviation Q$_3$ falls within this target range, the headlight-aiming adjustment control unit 7 proceeds to a step 177. At this step, the headlight-aiming adjustment control unit 7 indicates that the horizontal headlight aiming is acceptable. On the other hand, when the horizontal deviation Q$_3$ falls outside this target range, the headlight-aiming adjustment control unit 7 proceeds to a step 178. At this step, the headlight-aiming adjustment control unit 7 instructs the screwdriver unit 5 to tighten or loosen the adjuster screw 13 in accordance with a positive or negative deviation of the horizontal deviation Q$_3$ (i.e., a rightward or leftward deviation of the headlight optical axis having a fixed relationship with the inclination of the front lens surface of the headlight 12). Then, the headlight-aiming adjustment control unit 7 returns to the step 175 so as to repeat the cycle consisting of the steps 175, 175 and 178 until the horizontal deviation Q$_3$ falls within the target range.

At a step 179 subsequent to the step 177, the headlight-aiming adjustment control unit 7 instructs the screwdriver unit 5 to rotate the adjuster screw 13 through M turns so as to center the optical axis within the target range (i.e., zero the horizontal deviation Q$_3$).

At a step 180 subsequent to the step 179, the headlight-aiming adjustment control unit 7 instructs the industrial robot 4 via the robot control unit 6 to move the screwdriver unit 5 to the adjuster screw 14 to perform the up-and-down adjustment of the headlight optical axis. At a step 181 subsequent to the step 180, the CPU 7b of the headlight-aiming adjustment control unit 7 receives outputs A$_s$, B$_s$ and C$_s$ of the displacement sensors 132, 134 and 133 via the A/D converter of the headlight-aiming adjustment control unit 7 and retrieves compensation data D$_a$, D$_b$ and D$_c$ corresponding to the respective outputs of the displacement sensors 132, 134 and 133 fromt he memory 7a. Then, the headlight-aiming adjustment control unit 7 computes a vertical deviation value Q$_4$ in accordance with the following equation (2):

$$Q_4 = \frac{(B_s + D_b) + (C_s + D_c)}{2} - (A_s + D_a). \tag{2}$$

At a step 182 subsequent to the step 181, the headlight-aiming adjustment control unit 7 checks whether or does not the vertical deviations Q$_4$ falls within a target range.

When the vertical deviation Q$_4$ falls within this target range, the headlight-aiming adjustment control unit 7 proceeds to a step 183. At this step, the headlight-aiming adjustment control unit 7 indicates that the vertical headlight aiming is acceptable. On the other hand, when the vertical deviation $Q_4$ falls outside this target range, the headlight-aiming adjustment control unit 7 proceeds to a step 184. At this step, the headlight-aiming adjustment control unit 7 instructs the screwdriver unit 5 to tighten or loosen the adjuster screw 14 in the same manner as at the step 178. Then, the headlight-aiming adjustment control unit 7 returns to the step 181 so as to repeat the cycle consisting of the steps 181, 182 and 184 until the vertical deviation $Q_4$ falls within the target range.

At a step 185 subsequent to the step 185, the headlight-aiming adjustment control unit 7 instructs the screwdriver unit 5 to rotate the adjuster screw 14 through M turns in the same manner as at the step 179. At a step 186 subsequent to the step 185, the headlight-aiming adjustment control unit 7 once more checks whether or does not the respective horizontal and vertical deviations $Q_3$ and $Q_4$ fall within the target ranges in the same manner as at the step 86 in the first embodiment of this invention.

When both the horizontal and vertical deviations $Q_3$ and $Q_4$ are OK, the headlight-aiming adjustment control unit 7 proceeds to a step 187. At this step, the headlight-aiming adjustment control unit 7 indicates that both the horizontal and vertical deviations $Q_3$ and $Q_4$ are OK. Then, the headlight-aiming adjustment control unit 7 proceeds to the last step 174 as described above and ends the headlight-aiming adjustment program.

On the other hand, if either or both of the horizontal and vertical deviations $Q_3$ and $Q_4$ fall outside the corresponding target ranges, the headlight-aiming adjustment control unit 7 proceeds to a step 188. At this step, the headlight-aiming adjustment control unit 7 increments the counter (not shown) in order to count the number of iterations of the program from the step 172 up to 186.

At a step 189 subsequent to the step 188, the headlight-aiming adjustment control unit 7 checks whether or not this count has reached a given number N. If this count reaches N, the headlight-aiming adjustment control unit 7 proceeds to a step 190 similar to the step 91 in the first embodiment of this invention. On the other hand, as long as this count does not reach N, the headlight-aiming adjustment control unit 7 returns to the step 172 and repeats the program from the step 172 up to the step 186. Step 186 corresponds to the step 86 of the first embodiment.

Once the horizontal and vertical deviations $Q_3$ and $Q_4$ both fall within the respective target ranges, the laser light receiving elements 121 should receive the laser light reflected by the mirror plate 153 and confirm the alignment in the step 186. If the headlight is still accurately aligned, control passes to a step 187, in which the completion of the alignment process is displayed, and then to the final step 174 mentioned above. Alternatively, the laser receiving elements 121 may be used to detect and record the final deviation of the headlight optical axis from the desired alignment.

What is claimed is:

1. An apapratus for measuring a headlight optical axis aiming, comprising:
    means for measuring horizontal and vertical inclinations of a front lens surface of a headlight installed in a vehicle and producing outputs indicative of said incliantions, said measuring means comprising:
    a plurality of displacement sensors spaced from each other, and
    contacting means for coming into contact with the front lens surface, the contacting means being displaced in accordance with the inclinations of the front lens surface,
    each of said displacement sensors having a measuring rod connected to and movable with said contacting means for sensing said displacement of said contacting means when said contacting means comes into contact with said front lens surface;
    means supporting the displacement sensors; and
    means for determining the headlight optical axis aiming on the basis of a fixed relationship between the inclinations of a headlight optical axis and the front lens surface and said outputs from said measuring means.

2. An apparatus as recited in claim 1, wherein each of the displacement sensors comprises a potentiometer operated by the measuring rod.

3. An apparatus as recited in claim 1, wherein the contacting means comprises an inclination-sensitive plate inclining in accordance with the incliantions of the front lens surface and said supporting means comprises a resilient-support mechanism supporting the inclination-sensitive plate.

4. An apparatus as recited in claim 1, wherein each of the displacement sensors comprises a magnetic displacement sensor comprising said measuring rod which bears a magnetic grating and a head for reading the magnetic grating.

5. An apparatus as recited in claim 1, wherein each of the displacement sensors comprises the combination of a dial guage and a potentiometer with the measuring rod.

6. An apparatus as recited inclaim 3, wherein the resilient-support mechanism includes a guide rod connected to the center of the inclination-sensitive plate and the displacement sensors cover at least four independent measurement points on the inclination-sensitive plate, one pair of which lie in a horizontal plane passing through the center of the inclination-sensitive plate and the other pair of which lie in a vertical plane passing through the center of the inclination-sensitive plate.

7. An apparatus as recited in claim 1, wherein the displacement sensors cover at least three independent measurement points located at the apices of a triangle.

8. An apparatus as recited in claim 1, wherein the contacting means comprises a plurality of displacement-transmissive plates, which are free to mvoe in the direction of the axis of the measuring rod, one end of each of the measuring rods being connected to one of the displacement-transmissive plates.

9. An apparatus as recited in claim 8, wherein the supporting means has a plurality of main guide rods and a plurality of auxiliary guide rods, all of which are axially movable along the axis of the measuring rod, one end of each main guide rod being secured to the center of a corresponding displacement-transmissive plate and having an aiming pad for abutting the front lens surface, each displacement-transmissive plate having at least two opposite ends, one being secured to one of the auxiliary guide rods and the other being connected to the measuring rod.

10. An apparatus as recited in claim 1, futher comprising:
    a light-reflective mirror displaced by all of the measuring rods;

a laser transmitting laser light onto said light-reflective mirror; and a laser light receiving element receiving laser light reflected by said light-reflective mirror and actually measuring the aiming of the headlight optical axis.

11. An apparatus as recited in claim 1, further comprising:

means for detecting a spatial relationship between the front lens surface and the displacement sensors suitable for measuring the headlight optical axis aiming.

12. An apparatus as recited in claim 11, wherein said detecting means comprises a switch and a guide rod having an end falling within an area bounded by lines connecting all of measurement points of the displacement sensors, the guide rod moving axially in accordance with the inclinations of the front lens surface and actuating the switch.

13. A method for measuirng a headlight optical axis aiming, comprising the steps of:

measuring horizontal and vertical inclinations of a front lens surface of a headlight installed in a vehicle using a plurality of displacement sensors which are spaced from each other and have respective measuring rods axially moving in accordance with the inclination of the front lens surface; and checking the headlight optical axis aiming on the basis of the measured inclinations of the front lens surface.

14. An apparatus as recited in claim 1, wherein said checking means comprises means for providing each displacement sensor with compensation data for the front lens surface of a corresponding headlight so that measurement points of the displacement sensors are constant for each front lens surface.

* * * * *